Sept. 7, 1948.    E. S. AKER    2,448,651
NOISELESS RUDDER POST BEARING
Filed May 15, 1945
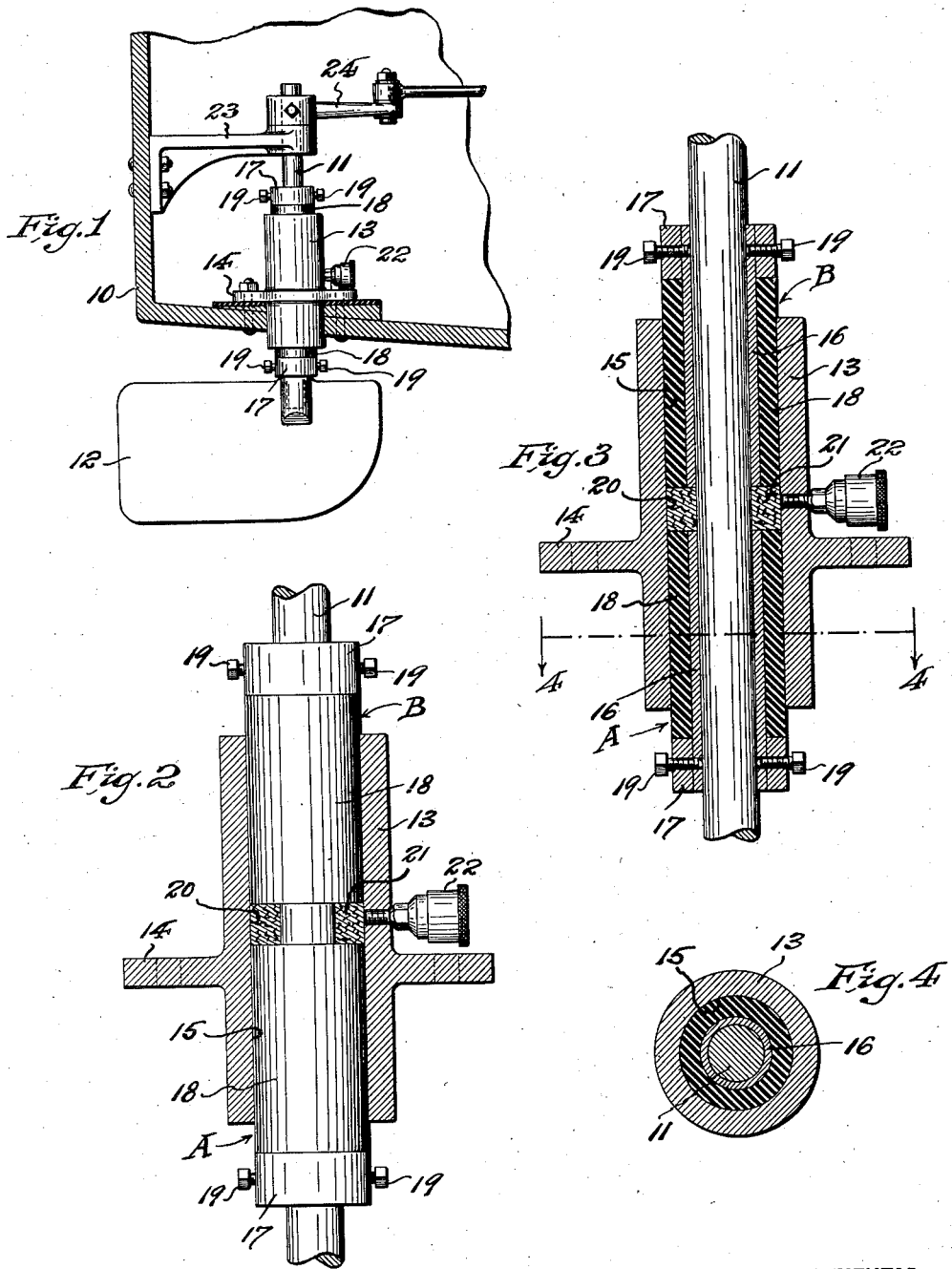
INVENTOR.
Evender S. Aker,
BY George D. Richards
Attorney Patented Sept. 7, 1948

2,448,651

UNITED STATES PATENT OFFICE 2,448,651

NOISELESS RUDDER POST BEARING

Evender S. Aker, West Point Pleasant, N. J.; Florence L. Aker executrix of said Evender S. Aker, deceased Application May 15, 1945, Serial No. 593,837

3 Claims. (Cl. 114—169)

This invention relates to improvements in combined bearing and stuffing box for boat rudder posts; and the invention has reference, more particularly, to a novel noiseless rudder post bearing and stuffing box structure.

The invention has for a further object to provide a novel rudder post bearing and stuffing box adapted to be affixed to a boat hull so as to extend from the interior to the exterior of the latter, and which comprises an endwise open bearing body having suitable means for fixedly attaching the same to a boat hull, together with novel journal means for rotation in the bearing body passage and adapted to be affixed to the rudder post to turn therewith; said means having a bearing portion of non-metallic material, such as rubber or the like, in noiseless rotatable engagement with the walls of said bearing body passage.

The invention has for a further object to provide a noiseless rudder bearing and stuffing box structure characterized as above set forth wherein the journal means comprises opposed journal members respectively entered in the upper and lower ends of the bearing body passage for rotation therein and adapted to be affixed to the rudder post to turn therewith, said journal members having bearing portions of non-metallic material, such as rubber or the like, for noiseless rotatable engagement with the walls of said bearing body passage; and said journal members being adjustably mounted on the rudder post with their inner opposed ends spaced apart to define a stuffing box chamber within the bearing body passage, adapted for the reception of a suitable compressible packing material to be disposed in direct interposition between the rudder post and bearing body, and whereby adjustment of the journal members toward each other may be utilized to tighten and set up the packing material in leakproof joint forming relation to the rudder post and bearing body.

Other objects of the invention, not at this time more particularly enumerated, will be understood from the following detailed description of the same.

An illustrative embodiment of the invention is shown in the accompanying drawings, in which:

Fig. 1 is a fragmentary sectional view of the stern portion of a boat hull equipped with rudder means, and the novel noiseless bearing and stuffing box structure for mounting the rudder post; Fig. 2 is an enlarged longitudinal sectional view of the noiseless rudder post bearing and stuffing box structure, the journal members of which are shown in elevation; Fig. 3 is a view similar to that of Fig. 2, but showing the journal members in section; and Fig. 4 is a transverse sectional view, taken on line 4—4 in Fig. 3.

Similar characters of reference are employed in the hereinabove described views, to indicate corresponding parts.

Referring to the drawings, the reference character 10 indicates the stern portion of a boat hull, affixed to the bottom of which is the rudder post bearing body and stuffing box structure through which the rudder post 11 of a rudder 12 extends. Said bearing body and stuffing box structure comprise a tubular bearing body 13, usually made of a suitable corrosion resistant metal such as brass, bronze or the like. Said bearing body 13 is provided intermediate its ends with a laterally extending footing plate or flange 14 adapted to be bolted or otherwise fixedly secured to the interior side of the hull bottom, whereby the lower end portion of said bearing body extends downwardly through and exteriorly of said hull bottom, and the upper end portion of said bearing body upstands within the hull interior.

Affixed upon the rudder post 11 is a rudder post journaling means having external bearing means made of non-metallic material, such as rubber or the like, which is diametrically sized to fit the bore 15 of the bearing body 13, so as to rotate in engagement with the walls of said bore, and which, being non-metallic, will turn noiselessly therein. In a preferred embodiment thereof, said journaling means comprises opposed journal members A and B respectively entered in the upper and lower end portions of the bearing body bore 15. Each journal member comprises an internal sleeve 16 of rigid material, preferably metal, having an internal diameter corresponding to the external diameter of the rudder post 11, so as to snugly fit around the latter and telescopically slide thereupon. Suitably connected to an exteriorly disposed end of said internal sleeve 16, so as to be unitary therewith, is a collar member 17 also made of rigid material, preferably metal. Suitably bonded to and along the length of said internal sleeve 16 below said collar member 17 is an external sleeve or bearing portion 18 made of non-metallic material, preferably of rubber of the like. Said external sleeve or bearing portion 18 is sized to possess an external diameter corresponding to the internal diameter of the bore 15 of said bearing body 10, so as to snugly fit the latter and yet freely turn therein. Threaded through the collar member 17 and contiguous portion of the internal sleeve 16 are one or more set screws 19, by means of which the journal member may be fixed to the rudder post 11, after desired axial adjustment of the former upon the latter.

One said journal member, as e. g. the journal member A, is entered in the lower end portion of the bearing body bore 15, while the other said journal member, as e. g. the journal member B, is entered in the upper end portion of said bearing body bore 15. By such disposition the inner ends of the journal members A and B are opposed one to the other within the interior of said bearing body bore 15, and are suitably spaced to thereby define an annular space intermediate the rudder post 11 and the walls of said bearing body, which space provides a stuffing box chamber 20. Disposed within said stuffing box chamber 20, and thus between the inner ends of the journal members A and B is a suitable compressible packing material 21.

To set up or compress the packing material 21, whereby to produce a leak-proof joint between the bearing body 10 and the rudder post 11, one of said journal members, as e. g. the journal member A is secured by its set-screws 19 in immovable relation to the rudder post 11, while the other said journal member, as e. g. the journal member B, is loosened, by relaxing its set-screws 19, so that it can be axially moved on said rudder post 11. The loosened or released journal member B is now forcibly slid downward on the rudder post 11 toward the fixed journal member A, thereby compressing the packing material 21 between the opposed inner ends of said journal members, so as to set up or laterally expand the packing material to tightly engage its surfaces with those of the rudder post 11 and bearing body walls in tight leak-proof joint forming relation thereto. After the packing material is thus set up, the set-screws of journal member B are tightened to bind or fix the latter to the rudder post, and so as to retain the packing material in the aforesaid set up condition.

It is ordinarily desirable to supply lubricant to the packing material 21 from time to time; to this end a grease cup 22, preferably of the squeeze injection type, is connected with and through the wall of the interior part of said bearing body 10, in position to communication with the stuffing box chamber 20.

The upper interior portion of the rudder post 11 is ordinarily supported in a bracket bearing 23 mounted within the boat hull interior, and affixed to the rudder post 11 above said bracket bearing is a steering arm or lever 24 by which the rudder post and rudder may be operatively turned, and by which the rudder post and rudder is supported against longitudinal displacement.

It will be understood, that by reason of the interposition of the rubber or other non-metallic external sleeves or bearing portions 18 of the journal members between the rudder post 11 and the walls of the bearing body, that said rudder post will be supported so to both turn noiselessly in the bearing body, and so as to be free from noise due to vibration of the one within the latter. Not only is a noiseless rudder mounting thus provided, but the structure also provides additionally a very simple and easily manipulated and adjusted means for packing the rudder post and bearing body against leakage.

Having now described my invention, I claim:

1. The combination with a boat bottom of a metallic rudder post bearing affixed thereto and therethrough, whereby the lower portion thereof projects exteriorly into the water, a rudder post, means within the boat to suspend said rudder post for downward extension through the axial bore of said bearing, said bore substantially exceeding in diameter the diameter of said rudder post, a pair of opposed journal members mounted on said rudder post, said journal members being respectively entered in opposite ends of said bearing body bore, each said journal member comprising an internal metallic sleeve slidable on said rudder post, each metallic sleeve terminating at its outer end in an annularly enlarged collar portion, and an external sleeve of rubber bonded to each internal metallic sleeve, said rubber sleeves having external diameters corresponding to the internal diameter of said bearing body bore so as to engage and turn in contact with the walls thereof, the collar portions of said journal members having means to releasably secure the latter to said rudder posts, and packing material intermediate the rudder post and the walls of said bearing body and to which inner ends of said journal members are opposed, said journal members being relatively adjustable axially to compress said packing material therebetween.

2. In the combination defined in claim 1, wherein the interior part of the bearing body, which is contiguous to said packing material, is provided with squeeze injection type means for supplying lubricant to the packing material.

3. The combination with a boat bottom of a metallic rudder post bearing affixed thereto and therethrough, whereby the lower portion thereof projects exteriorly into the water, a rudder post, means within the boat to suspend said rudder post for downward extension through the axial bore of said bearing, said bore substantially exceeding in diameter the diameter of said rudder post, a pair of opposed rubber journal members mounted on said rudder post in spaced apart relation and so as to rotate with the post and in contact with the walls of said bearing, packing material interposed between the opposed inner ends of said journal members between the walls of said bearing and said rudder post, said journal members being relatively adjustable axially to compress said packing material between the opposed ends thereof, and means to fix said journal members on said rudder post in such relatively adjusted position.

EVENDER S. AKER.

REFERENCES CITED

The following references are of record in the file of this patent:

UNITED STATES PATENTS

| Number | Name | Date |
|---|---|---|
| 1,336,076 | Ellmauer | Apr. 6, 1920 |
| 1,475,344 | Judson | Nov. 27, 1923 |
| 1,761,533 | Patch | June 3, 1930 |
| 1,797,223 | Annis | Mar. 24, 1931 |
| 2,244,054 | Cornell, Jr. | June 3, 1941 |